Patented Jan. 22, 1935

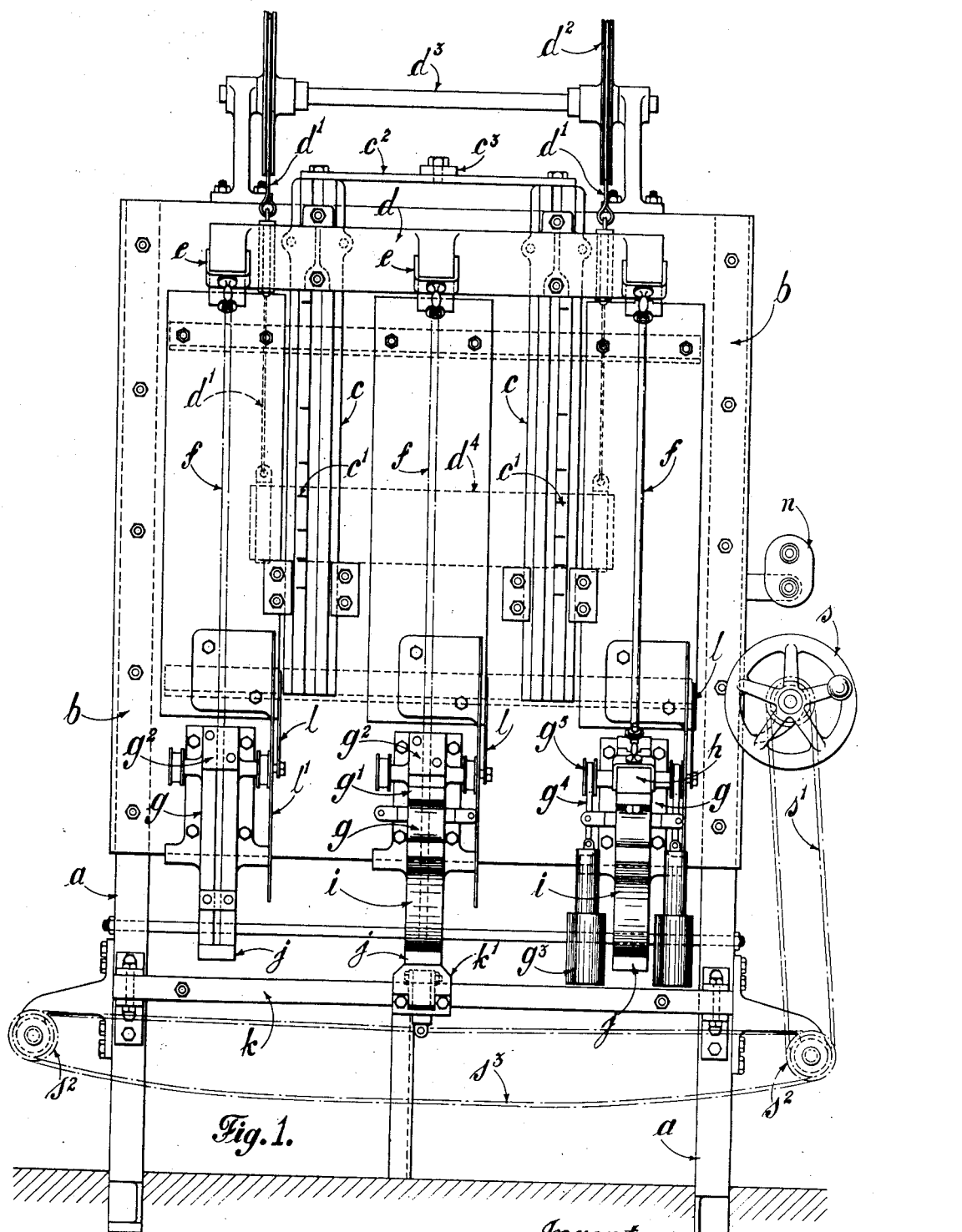

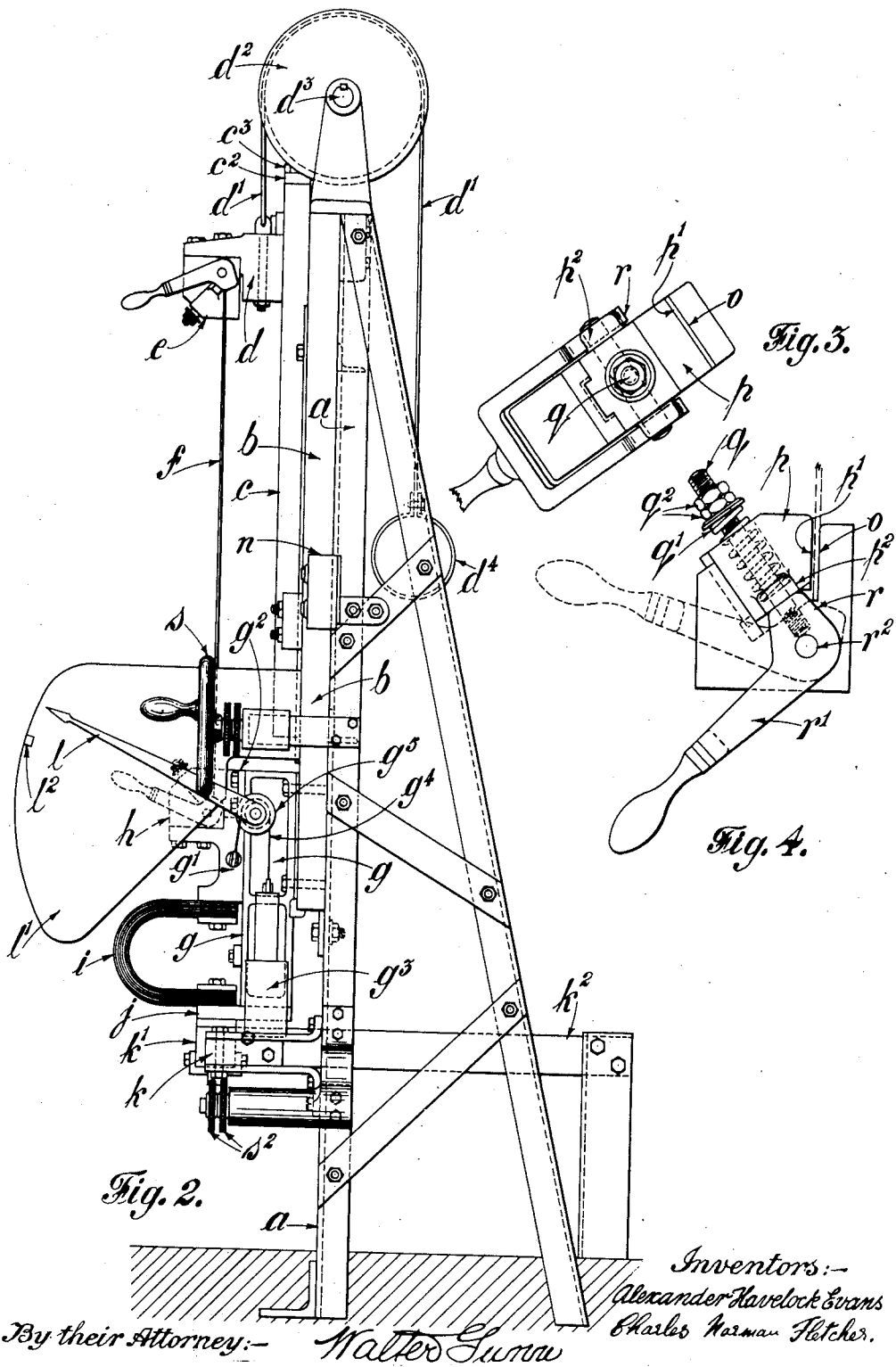

1,988,869

UNITED STATES PATENT OFFICE 1,988,869

APPARATUS FOR HARDENING HACK-SAW BLADES AND THE LIKE

Alexander Havelock Evans, Cheadle, and Charles Norman Fletcher, Cheadle-Hulme, England Application March 3, 1932, Serial No. 596,436 In Great Britain June 16, 1931

7 Claims. (Cl. 219—11)

This invention relates to an improved method of and means for hardening hack-saw blades, and exclusively to hack-saw blades of high speed steel.

The hardening of high speed steel saw blades by heat treatment has been practiced for many years and is known to present certain problems. Firstly, there is the characteristics of the metal itself requiring very high temperatures. Secondly, there is the nature of the article itself and the question of burning or distortion during both the heating and cooling, and thirdly, there is the question of subsequent annealing or "letting down" of the ends of the saw to give them "temper" and reduce their brittleness or liability to fracture in the clamps when in use.

The usual process for hardening high speed steel hack-saw blades consists of hardening the whole saw blade and subsequently annealing the ends in a separate process. It is well known that "high percentage" tungsten steels, and like high-speed steels, are very difficult to anneal after hardening and can only be thoroughly annealed by a prolonged heat treatment. The cost of annealing the ends of high-speed steel saw blades may well exceed the cost of the hardening and even then the degree and uniformity of the annealing is generally uncertain. Also the heating of high-speed steel saw blades for their hardening is quite a problem owing to the high temperatures required. Known apparatus applicable for this purpose are, chamber furnaces heated by gas, oil, or electricity using either radiated heat or conducted heat by "salts" or other media, all of which apparatus in practice involve heavy maintenance costs due to the necessary high working temperatures. Further, the size of blade which can be heated in a furnace is limited by the length or depth of the furnace, and the greater this dimension, the more difficult it is to obtain and maintain the necessary temperature throughout, with sufficient accuracy. This difficulty is considerably increased under working conditions with the loading and unloading of the furnace, especially as the loading is performed with a cool charge tending to cause uneven temperatures and cooling of the furnace. It is also a known fact in heating any article in a furnace, all edges and projections are liable to be overheated and some of the edge is lost.

Such blades even though made of high speed and normally air hardening steel are at present usually hardened by quenching. The quenching is done irrespective of the kind of steel immediately the blades are drawn from the furnace, to prevent the twisting and warping which otherwise rapidly take place, the blades being usually held unrestrained.

It has however, been proposed in the heat treatment of steel rails, rods, wire tubes and even saws of carbon steel but not high speed steel to employ a heavy electric current passed through the article for heating it, and except in the case of the saws to suspend the same to keep them straight and also to hold them so as to permit expansion during heating.

In the use of an electric current for heating an article it is a known drawback that the end pieces, to which the electrodes are connected, do not get the same heating. This drawback has usually been dealt with by treating such ends as scrap, and in one case a special form of electrode has been evolved to get uniform heating for its full length. In no case has it been previously proposed to make use of this effect at the ends.

The object of the invention is to overcome the above difficulties, including the waste, and to provide a better hardening process both in efficiency and economy and also an improved apparatus therefor.

According to the invention the improved process of hardening high speed steel hack saw blades wherein an electric current is passed through the blade supplied through clamps holding the ends of the blade, characterized in that the clamps are of a size to cover the entire end parts of the blade and of a relatively large mass so that such ends of the saw blade are kept relatively cold to prevent them attaining a hardening temperature.

In the accompanying drawings:—

Fig. 1 is a front elevation of one example of apparatus for hardening hack-saw blades in accordance with the invention.

Fig. 2 is a side elevation of Fig. 1.

Figs. 3 and 4 are plan and side elevation to a larger scale of the clamps for the saw blades.

As illustrated the apparatus consists of a stand $a$ about 7 feet high supporting a vertical slate panel $b$ measuring 4' x 4', the lower edge of which panel is about 2' from the floor. On the front face of the panel $b$ are two vertical electrically conductive slide rails $c$ of bronze, graduated at $c^1$ to take the various lengths of blade. Sliding vertically on these slide rails is a cross member $d$ to which are attached three quick-acting clamps $e$, one of which is described later in detail, gripping the top ends of the blade $f$. The cross member $d$ suspended by cables $d^1$ passing over pulleys $d^2$ on the shaft $d^3$ mounted in brackets secured to the top of the frame, the other ends of the cables being connected to a counter weight $d^4$.

The slide rails $c$ are joined at the top by a "bus bar" $c^2$ to which is connected the main conductor $c^3$. The above assembly is of sufficient cross sectional area to carry the necessary heavy current up to 10,000 amperes, without undue heating. Alternating current of the usual low frequency (about 50 cycles) is preferred for the process. Attached to the bottom end of the panel $b$ there are three cast iron vertical slides $g$, two of which are shown fitted with a separate bronze sliding carriage $g^1$ to the upper ends of which are fitted quick-acting clamps $h$ for the bottom ends of the blades, similar in detail to the upper quick-acting clamps $e$. The upper end of the slide is provided with a stop $g^2$. To the other and lower end of the slides $g$ there is fitted a flexible laminated copper conductor $i$ leading to bottom terminals $j$ which are separated one from the other. Below these bottom terminals is a slide rail $k$ fitted with a sliding terminal or shoe $k^1$ which can be moved into contact with each of the above separate three terminals $j$ enabling the operator to make or break the circuit on each or either of the blades $j$ secured between the upper and lower clamps $e$ and $h$. The sliding carriage $g^1$ at the bottom of the slate panel, are each provided with a suitable counter-balancing arrangement consisting of weights $g^3$ attached to straps $g^4$ and suspended over pulleys $g^5$ carried by the slides $g$ whereby the tension can be adjusted as required for blades of the various cross-sections can be suitably arranged. The movement of this counter-balancing arrangement can be conveniently used for indicating the various temperatures necessary for the production of the saw blades. For that purpose a pointer $l$ is provided connected to one of the pulleys $g^5$ besides each of which is arranged a shield $l^1$. The pulley carrying the pointer is pinned to its cable so that the pointer moves definitely with the carriage $g^1$. An index $l^2$ may be provided adapted to clamp to the edge of the shield and to be used as a mark in co-operation with the pointer. The electric circuit is controlled by a contactor, which is controlled by a relay button switch $n$ or which may be automatically operated from the movements of the sliding carriage $g$ directly, or by contacts operated by the pointer to switch off when the predetermined temperature has been reached. The sliding contactor shoe $k^1$ is fitted with a flexible laminated conductor $k^2$ for the return circuit.

The clamps each consist of a body having a V-shaped opening, the vertical face $o$ of which forms one of a jaw. The other face of the opening is inclined forward at about 45 degrees, and shaped to form a slide for a sliding jaw block $p$ having a vertical face $p^1$ opposite to the face $o$. The body of the clamp is fitted with a projecting stud $q$ secured into the bottom of the V-shaped opening and parallel with the inclined face thereof which stud passes through the sliding jaw block $p$ and is provided with a spring $q^1$ and adjustable nuts $q^2$ for leading the spring, forcing the sliding jaw down its inclined slide into the V-shaped opening.

On each side of the sliding jaw is a lug $p^2$ which lugs are adapted to be engaged by the cam shaped ends $r$ of a lever $r^1$ pivoted at $r^2$ on the body of the clamp, such engagement operating to move back the sliding jaw $p$ against the spring $q^1$. The pressure or grip of the jaw is dependent upon the spring $q^1$ the leading of which is adjustable as aforesaid by the nuts $q^2$. The upper and lower clamps are of identical construction but are reversed in position, the bodies of the upper clamps being secured to the cross member $d$ and the bodies of the lower clamps being each secured to their separate carriages $g^1$.

For moving the sliding shoe $k^1$ into engagement with the terminals $j$ a hand wheel $s$ is provided on the side of the frame in a convenient position adjacent to the control switch $n$. The shoe $k^1$ is secured to a chain $s^1$ arranged below the rail $k$ on pulleys $s^2$ one of which is connected by a further chain $s^3$ to the hand wheel $s$.

In operation, for hardening high speed steel blades the machine is first set by raising or lowering the cross member $d$ to the graduation on the slide rails $c$ for the length of blade to be hardened. The electrical apparatus which is not described as its construction forms no part of this invention, is then set to give the required voltage and amperage for that section and length of blade. Each blade is then fitted separately, first into the upper clamp by raising the lever $r^1$ inserting the blade into the open clamp, and then lowering the lever allowing the clamp to close. The carriage $g^1$ carrying the lower clamp is then raised with the clamp open until it comes against the stop $g^2$ and the clamp is then closed on the saw blade when the required length of each end of the saw, to be kept soft, will be within the clamps. The saw will then be under slight tension due to the unbalanced weight of the carriage $g^1$, which must only be a few ounces but sufficient so that the carriage will descend with the expansion of the saw blade as the latter expands on heating.

The sliding shoe $k^1$ is then moved along its rail $k$ by means of the hand wheel $s$ until it is below and in engagement with the terminal $j$ of the lower clamp to which the saw blade has just been fitted. The electric current is then switched on by pressing the "on" control button of the relay switch $n$. The current heats the blade to the required temperature in about 10 to 30 seconds, and as the blade extends the carriage $g^1$ descends keeping the blade under a slight tension. The descent of the carriage is indicated by the movement of the pointer $l$ in front of the shield $l^1$ and when the pointer is seen to have reached the index $l^2$ the current is switched off by pressing the "off" button of the switch $n$. The sliding shoe $k^1$ may then be moved on to the next terminal $j$ and the heating up of another blade started while the other blade is cooling in the clamps and still under slight tension. The index $l^2$ is set for the blades in the first place by the aid of a pyrometer, such as that known as the disappearing filament pyrometer. A further saw blade may be fitted in the adjacent clamps while one is being heated without risk to the operator. By the time the second blade has been heated and the shoe moved across for heating the third blade, the first blade will have cooled enough to be removed without distortion and will be air hardened. The heating up of the saw must extend over a certain period of time to allow the heat to extend to the teeth which heat up more slowly than the body of the saw. This lag or delay in the heating up of the teeth is in direct contra distinction to the advanced heating up or overheating of the teeth when the blade is heated in a furnace. The consequent advantage of this difference is that the blade may be taken to higher temperatures without danger of fusing and with much less deterioration of the "edge" of the teeth.

Cooling may be assisted by air blast or means may be provided for quenching (which is necessary for carbon or low percentage tungsten steel blades) either with or without removal of the blade from the grips.

The apparatus may be designed for a continuous process, the grips being mounted on conveyors and the blades carried automatically through the heating and cooling stages of the hardening process. A rotating drum or carriage may be used instead of the conveyors. The design of such an apparatus might include the automatic feed of the blades to the clamps and their delivery after treatment and is not described or claimed therein except in so far as it embodies this envention as it is within the capacity of any engineer to evolve a design of such apparatus.

The invention is not limited to the particular details of the above apparatus, the important features of the invention being the single process of hardening the saw and at the same time providing the relatively softer ends thereof, the high thermal efficiency of the direct heating, the economy of the blade acting as its own heating element, the prevention of distortion, the ease of temperature control, the simplicity of operation and the almost complete elimination of scrap during heat treatment from burning or damaging of the teeth, or from other reasons.

What we claim is:—

1. Apparatus for use in the hardening of high speed steel hack-saw blades by passing a heavy current of electricity through them, comprising a vertical frame or back with a vertical slide rail on one face, a clamp slidable on such rail to hold the upper end of a saw blade, counterbalancing means for the clamp passing over a pulley at the top of the frame, means for setting the clamp in an adjusted position on the rail, a further clamp mounted in a vertical slide at a lower part of the frame to hold the lower end of the saw blade, a stop to limit the upward movement of such further clamp, a counterbalance weight for the further clamp but of slightly less weight than the clamp, means for insulating the two clamps from each other on the frame or back, and means for connecting the clamps to a current supply, the clamps being of a size to cover substantially the entire end parts of the blade and being of a relatively large mass so as to keep the ends of the blades relatively cool and soft.

2. Apparatus for use in the hardening of high speed steel hack-saw blades by passing a heavy current of electricity through them, comprising a slab of non-conducting material supported vertically in a frame, vertical slide rails thereon and a common clamp-carrying bar on the slide rails, clamps mounted in an inverted position on the carrying bar for receiving the upper ends of saw blades, a counter-balance weight for the clamp-carrying bar connected thereto by flexible elements passing over pulleys at the top of the frame, further vertical slide rails on the slab, at its lower part, a clamp slidable on each of the further rails to receive the lower end of a saw blade, stops to limit the upward movement of the lower clamps, a counter-balance weight for each lower clamp but of slightly less weight, and means for connecting the clamp-carrying bar and the lower clamps to an electric current supply circuit, the clamps being of a size to cover substantially the entire end parts of the blade and being of a relatively large mass so as to keep the ends of the blades relatively cool and soft.

3. Apparatus as claimed in claim 2, wherein the means for connecting the lower clamps to the electric circuit comprises a contact member mounted on a conveyor extending across the frame, and means for traversing the contact below the said clamps to engage any one of them at will.

4. Apparatus as claimed in claim 2, wherein the means for connecting the lower clamp to the electric circuit comprises a laminated copper conductor of U-shape below and connected to each such clamp, a terminal block on the lower arm of each conductor, and a contact member mounted on a conveyor extending across the frame with means to traverse the contact member into engagement with any one of the terminal blocks.

5. In apparatus as claimed in claim 1, a pointer operated by relative movements of the lower clamp and its balance weight to indicate variations in the length of the saw blade.

6. In apparatus for hardening of high speed steel hack saw blades by passing a heavy current of electricity through them, a clamp for each end of the saw blades comprising a fixed jaw, a movable jaw mounted on the fixed jaw and slidable in a direction at an acute angle to the contacting jaw faces, a compression spring tending always to close the clamp, and a hand lever pivotedly mounted on the fixed jaw with a cam extension to engage and move the slidable jaw into the open position against the resistance of the spring, the clamp jaws being of a size to cover substantially the entire end parts of the blade and being of a relatively large mass so as to keep the ends of the blades relatively cool and soft.

7. Apparatus for use in the hardening of high speed steel hack saw blades by passing a heavy current of electricity through them, comprising an upper clamp adjustable to set positions on a vertical frame, a balance weight therefor, a lower clamp slidable vertically on the frame, a balance weight therefor of slightly less weight and means to connect the clamps to opposite poles of an electric circuit, the clamps being of a size to cover substantially the entire end parts of the blade and being of a relatively large mass so as to keep the ends of the blades relatively cool and soft.

A. H. EVANS.
C. NORMAN FLETCHER.